March 16, 1965     M. F. KOENIG     3,174,078
CIRCUIT BREAKER INSTALLATION
Filed May 16, 1960     3 Sheets-Sheet 1

Inventor
Martin F. Koenig
By H R Ratter
Attorney

March 16, 1965   M. F. KOENIG   3,174,078
CIRCUIT BREAKER INSTALLATION
Filed May 16, 1960   3 Sheets-Sheet 2

Inventor
Martin F. Koenig
By H R Rather
Attorney

March 16, 1965   M. F. KOENIG   3,174,078
CIRCUIT BREAKER INSTALLATION
Filed May 16, 1960   3 Sheets-Sheet 3
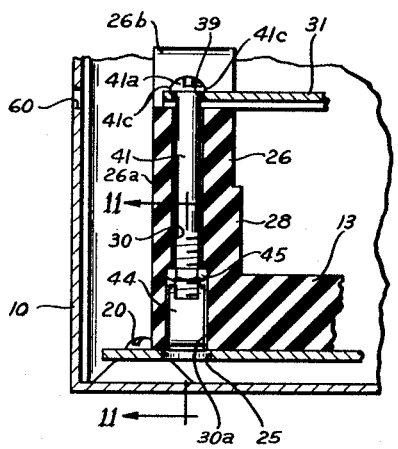
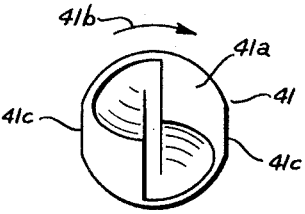
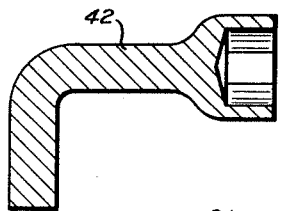
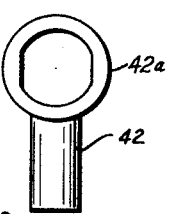
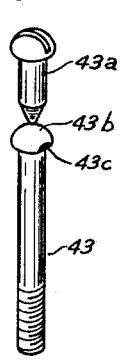
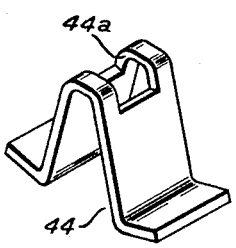
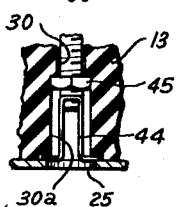
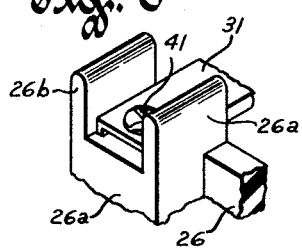
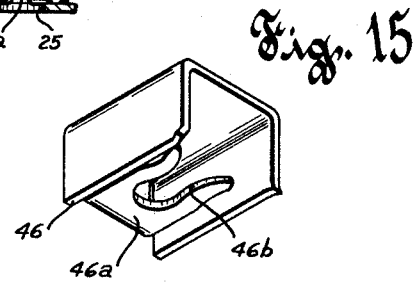
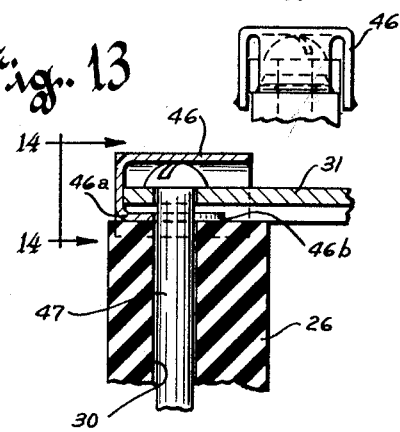
Inventor
Martin F. Koenig
By H R Ratter
Attorney

# United States Patent Office 3,174,078
Patented Mar. 16, 1965

3,174,078
CIRCUIT BREAKER INSTALLATION
Martin F. Koenig, Milwaukee, Wis., assignor to Cutler-Hammer, Inc., Milwaukee, Wis., a corporation of Delaware
Filed May 16, 1960, Ser. No. 29,245
8 Claims. (Cl. 317—119)

This invention relates generally to circuit breaker installations. More particularly it relates to means which render it difficult to attach or remove circuit breaker devices to or from mounting panel assemblies.

So-called "domestic" type circuit breaker installations usually comprise a wall mounted enclosure box within which a circuit breaker mounting panel assembly is removably mounted. The mounting panel assembly is adapted to accommodate a plurality of circuit breaker devices which are manufactured so as to be substantially identical in external physical characteristics but which are modified internally so as to have different load carrying capacities or tripping points suitable for the circuit with which they are to be employed. Presently, it is not uncommon for inexperienced or unauthorized personnel to remove a circuit breaker device of given capacity, for example, one which trips at 20 amperes, and to replace it by one of higher capacity, such as one which trips at 50 amperes, in order to increase the load carrying capacity of a particular circuit so that additional electrical appliances can be accommodated. The potential fire hazard created by such practices, particularly in older residential and commercial establishments, has precipitated legislation by various regulatory bodies which, in effect, requires, or would require, that circuit breaker mounting panel assemblies and the circuit breaker devices therefor be so constructed that after initial installation, replacement or addition of circuit breaker devices by unauthorized or inexperienced personnel is rendered difficult if not substantially impossible to accomplish. It is desirable, therefore, to provide improved apparatus for use in circuit breaker installations which, while meeting the above described requirements, still retains great flexibility in application, and which is economical and feasible to manufacture.

In this context "difficult" means that replacement cannot be accomplished unless cutting tools are employed to circumvent the locking means, or substantial displacement of the panel assembly from the enclosure box is required, or a special tool or device is needed to release the locking means, or damage to the mounting means, circuit breaker or electrical connections would result.

Accordingly, it is an object of this invention to provide improved circuit breakers and panel assemblies which are adapted to accomplish the aforesaid objectives.

Another object is to provide improved circuit breakers and panel assemblies which, while constructed to prevent tampering therewith by inexperienced or unauthorized personnel, are readily adapted to be serviced by skilled electricians or other qualified personnel.

Still another object is to provide improved locking means for use with panel assemblies and circuit breakers, said locking means comprising a bar-like member which is associated with a panel assembly so as to prevent the attachment of additional circuit breakers or the removal of circuit breakers already in place.

A further object is to provide a bar member which is attachable to and detachable from the panel assembly while the panel assembly is secured within its enclosure box.

A still further object is to provide a bar member of the aforesaid character which is attachable to and detachable from the panel assembly only if the panel assembly is removed from its enclosure box.

A specific object of the invention is to provide improved securing means for said bar member comprising a so-called "one way" screw having a head which is adapted to accommodate an ordinary screw driver for insertion purposes but requires a special tool for removal.

Another specific object is to provide improved securing means for said bar member comprising a "break-off" type screw which requires a special tool for removal.

An even more specific object is to provide improved means for concealing the head of an ordinary type screw employed to secured said bar member.

Another object is to provide an improved circuit breaker device which is adapted to be attached to or removed from a panel assembly while the aforementioned bar members are associated with the panel assembly.

A still further object is to provide improved locking means of the aforesaid character which are readily adapted to mass production techniques, which are reliable in use, which are economical to fabricate, and which are suitable for use with various types of circuit breaker devices.

Other objects and advantages of the invention will hereinafter appear.

The accompanying drawings illustrate several preferred embodiments of the invention, it being understood that the embodiments illustrated are susceptible of changes with respect to details thereof without departing from the scope of the appended claims.

In the drawings:

FIG. 5 is a cross-sectional view, similar to that of FIG. 3, showing alternative means, namely, a "one-way" screw for securing the locking bar to the panel assembly;

FIG. 6 is a fragmentary perspective view of a portion of an insulating board shown in FIGS. 1 to 5;

FIG. 7 is an enlarged top plan view of the head of the "one-way" screw shown in FIG. 5;

FIGS. 8 and 9 are views of a special removal tool adapted for use with the one-way screw of FIG. 5 and FIG. 12;

FIGS. 10 and 11 are views of a nut supporting device which may be employed in certain embodiments of the invention;

FIG. 12 is a perspective view of a "breakoff" screw that may be used instead of the screw shown in FIGS. 5 and 7;

FIGS. 13, 14 and 15 are views of a cover member which may be employed with the locking bar to conceal the head of a conventional screw.

It is to be understood that in the various figures similar elements have been designated by the same reference numerals.

Figure 1:
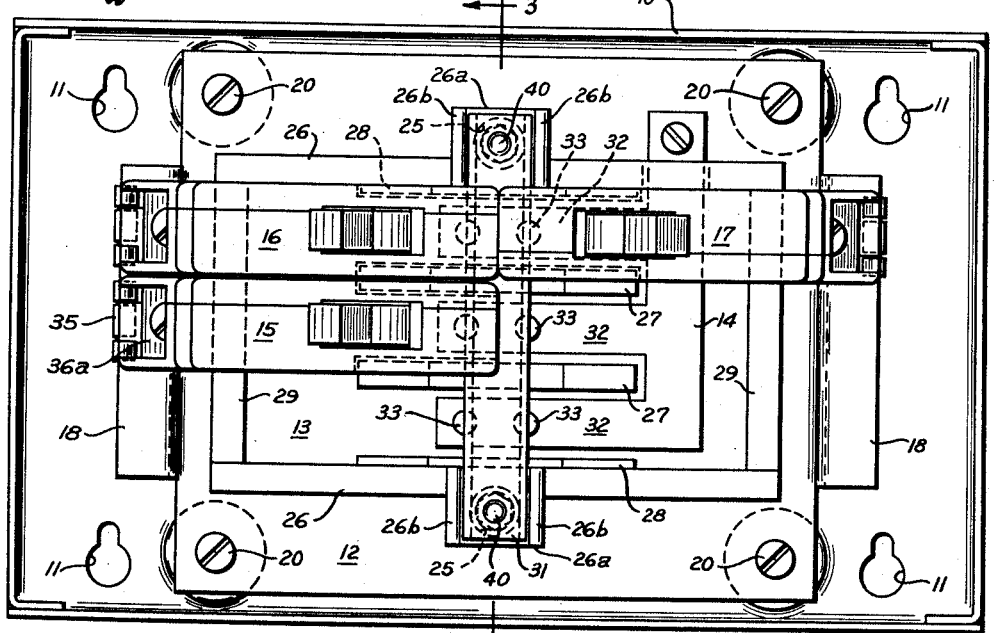
FIGURE 1 is a plan view of the interior of a circuit breaker enclosure box showing a circuit breaker panel assembly mounted therewithin and showing three circuit breaker devices mounted on the panel assembly and locked in place thereon by a locking bar.

Referring first to FIGS. 1 through 4, the numeral 10 designates an enclosure box, fabricated of sheet metal, having a floor which is provided with four keyhole-shaped mounting holes 11, shown in FIG. 1. Assume that box 10 is adapted to accommodate a suitable cover (not shown) and that the walls of the box are provided with well-known "knockouts" (not shown) for accommodating conductor wires (not shown).

A circuit breaker panel assembly is removably mounted within box 10 and comprises a base plate 12, preferably fabricated of rigid sheet metal, an insulating board 13, preferably molded from electrical insulating material, and an electrically conductive bus bar 14. The panel assembly is adapted to accommodate six circuit breaker devices but for purposes of illustration only three devices 15, 16 and 17 are shown mounted thereon.

Base plate 12 is a flat rectangular member having two integrally formed, oppositely disposed, upwardly bent side walls and each side wall terminates in a flange 18. Base plate 12 has four untapped holes 19 which accommodate the screws 20 which are accessible from the front of the panel assembly and take into four threaded holes 21 in bosses formed in the floor of enclosure box 10 to secure the panel assembly within the box.

Base plate 12 has four additional untapped holes 22 which accommodate the screws 23 which take into the threaded inserts 24 which are embedded or otherwise secured to insulating board 13. The screws 23 secure the insulating board 13 to the base plate 12 and are accessible only if the base plate 12 is removed from the enclosure box 10. Base plate 12 is also provided with two access holes 25 which are employed in one embodiment of the invention as will hereinafter appear.

Insulating board 13 is provided with two end walls 26 and with two upwardly projecting guides 27 which are disposed between the end walls 26 in parallel relationship to the end walls and each other. The inner surfaces of the end walls 26 have projecting portions 28 which are substantially identical in contour to the guides 27. The guides and end walls define spaces for and afford support for the circuit breaker devices employed with the panel assembly. Insulating board 13 is further provided with two upwardly projecting portions 29 which are disposed at right angles to the guides and end walls. Each end wall 26 is provided with an integral outwardly extending boss 26a which has parallel barrier portions 26b extending above the upper end of its wall 26. Holes 30 centered between barriers 26b extend through the bosses 26a to the bottom surface of board 13 and are in axial alinement with the access holes 25 in base plate 12. Each hole 30 accommodates a bolt, hereinafter described in particular with each embodiment of the invention, which is employed to secure a locking bar 31, hereafter described, to the panel assembly. As FIGS. 2, 3, 5 and 11 show, hole 30 is of wider bore, as at 30a, at the end nearest plate 12 in order to accommodate the head of a bolt or the nut therefor, as the case may be, and to afford a shoulder against which the bolt head or nut may be drawn. It is preferred that the bore 30a have a hexagonal cross-sectional configuration so as to prevent rotation of a hexagonal nut disposed therein in certain embodiments of the invention, as will hereinafter appear.

Bus bar 14, which may be assumed to be secured to insulating board 13 by suitable means (not shown), has three integrally formed fingers 32 which extend into the slots or spaces defined by the insulating board 13 for the circuit breaker devices. The end of each finger 32 is provided with two rigidly attached, electrically conductive contact posts 33 which are disposed on either side of the center line of the panel assembly and are adapted to accommodate the circuit breaker terminals. As will be understood, bus bar 14 is adapted to have a suitable conductor wire (not shown) attached thereto to effect energization thereof.

The circuit breaker devices 15, 16 and 17 shown mounted on the panel assembly may be assumed to be substantially identical to each other, therefore, only circuit breaker device 15 will be described in detail hereinafter.

Circuit breaker device 15 comprises a casing molded of electrical insulating material. The bottom wall of the casing is provided with an integrally formed projection 34 near the left-hand side thereof (with respect to FIGS. 2 and 4) which cooperates with a hooking member 35 which is rigidly secured to the casing, and an adjacent portion 29 of board 13 to secure the circuit breaker device 15 to the panel assembly and prevent endwise movement thereof. An electrically conductive, bifurcated terminal member 36 projects through the bottom wall of the circuit breaker casing and is adapted to engage the appropriate contact post 33 on the bus bar 14 of the panel assembly. The opposite sides of the circuit breaker casing adjacent bifurcated terminal member 36 are indented as at 27a and 27b to accommodate the guides 27 on the insulating board 13. Circuit breaker device 15 is also provided with a screw type terminal 36a which is not a part of the invention and will not be described further. In accordance with the invention, the forward wall of the circuit breaker casing is provided with an L-shaped slot 37 through which locking bar 31, hereinafter described, can be inserted. The circuit breaker device 15 is normally attached to the panel assembly by tilting the circuit breaker device to a cocked position, engaging hooking member 35 with flange 18 of base plate 12 of the panel assembly, and pivoting the circuit breaker device so that it slips between the guides 27 of insulating board 13. The bifurcated terminal member 36 of the circuit breaker device then engages contact post 33 of the bus bar 14 and the circuit breaker device is then rigidly supported on the panel assembly. Normally, circuit breaker device 15 is removable from the panel assembly by reversing the aforedescribed steps.

Each of the several embodiments of the invention hereinafter more particularly described contemplates attachment of one or more circuit breakers to the panel assembly, insertion of the locking bar 31 endwise through the L-shaped slot in the circuit breaker casing, and attachment of the locking bar to the panel assembly. The locking bar 31 is a rigid member having a U-shaped or channel-shaped cross-sectional configuration and, as FIGS. 1, 2 and 4 make clear, is of sufficient width to be insertable through two oppositely disposed circuit breakers. The locking bar 31 is provided with a hole 39 near each end thereof which, when the bar is in place between barriers 26b of boss 26a, registers with the holes 30 in insulating board 13. The holes 39 adapt the bar for attachment to the panel assembly.

Figure 2:
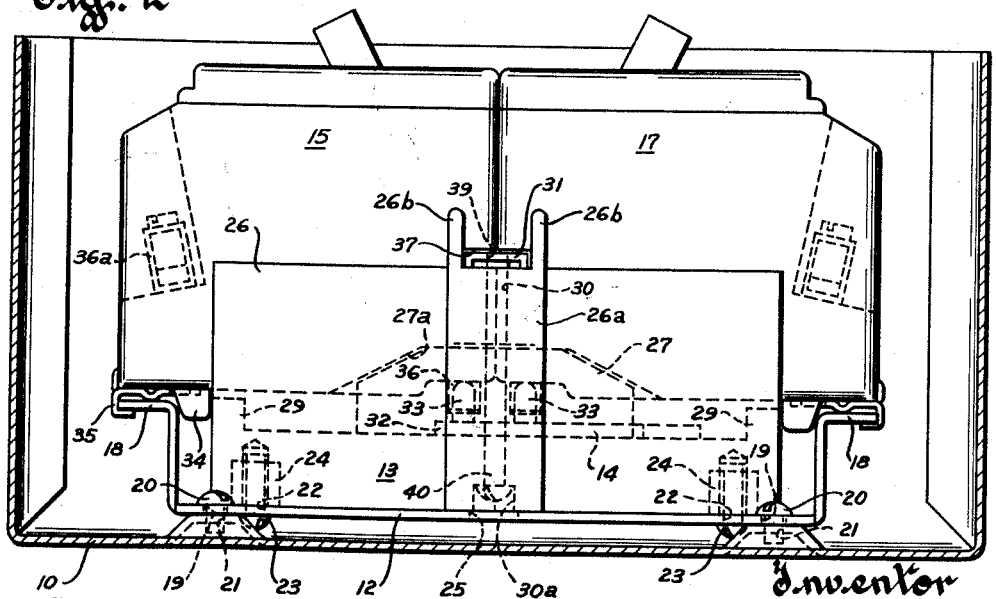
FIG. 2 is a side elevational view of the apparatus shown in FIG. 1 with one side of the enclosure box cut away.
Figure 3:
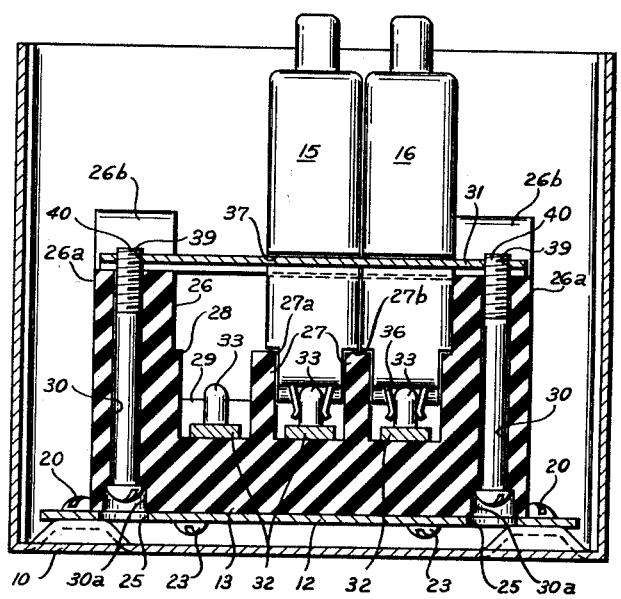
FIG. 3 is a cross-sectional view of the enclosure box and panel assembly taken along line 3—3 of FIG. 1.

In the embodiment of the invention shown in FIGS. 1, 2 and 3 the holes 39 are threaded and are adapted to engage the bolts 40 which are insertable and removable only when the panel assembly is removed from the enclosure box 10. The bolts 40 are well known types having no special modifications.

In the other embodiments of the invention, as FIGS. 5 and 11 show, the holes 39 are not required to be threaded and are adapted to accommodate several types of bolts which are insertable and removable, as will appear, while the panel assembly is secured within the enclosure box 10.

One such type of bolt 41 is seen in FIGS. 5, 6 and 7 and has a specially modified head 41a which permits it to be rotated in the direction of arrow 41b (FIG. 7) by an ordinary screw driver (not shown) but which requires a special tool, namely, a wrench 42 having flats 42a in the opening thereof, seen in FIGS. 8 and 9, to rotate it in the opposite direction. Head 41a of bolt 41 is provided with flat surfaces 41c on opposite sides which are not readily engageable by tools such as pliers or wrenches when in place but are engageable by the removal tool 42. Moreover, the provision of the upstanding barriers 26b on the bosses 26a prevents, or at least makes difficult, the use of common forms of wrenches or pliers in attempting to remove the bolts 41.

Another type of bolt 43 is shown in FIG. 12 and is seen to have a "break off" head 43a attached to a smooth head 43b. Head 43b is provided with flat surfaces 43c which are engageable by the tool 42 shown in FIGS. 8 and 9. In use, bolt 43 is driven into place by an ordinary screw driver and the head 43a is then broken off. Removal of the bolt 43 is then not possible with ordinary tools but is readily removable with a tool such as 42.

FIGS. 5, 10 and 11 show a nut supporting element 44 which is employed in certain embodiments of the invention to support a nut 45 which is employed to secure bolts such as 41 and 43 in place. Element 44 could, for example, be fabricated of fiber material and is disposed in the wider bore 30a of hole 30 in insulating board 13 during manufacture and before the insulating board 13 is secured to the base plate 12. Element 44 is initially an elongated member folded or bent as shown in FIG. 9 and provided with a hole 44a for accommodating the end of the shank of the bolt, as FIGS. 5 and 11 show. It is, of course, understood that the nut 45 is inserted in place along with the element 44 during manufacture.

FIGS. 13, 14 and 15 show a cap or cover 46 which is employed in one embodiment of the invention to conceal the head of a bolt 47 to discourage tampering therewith. Cover 46 is initially a flat member bent as shown and provided with a tab 46a having a slot 46b which slips between the locking bar and the top of end wall 26 and engages the shank of bolt 47.

Figure 16:
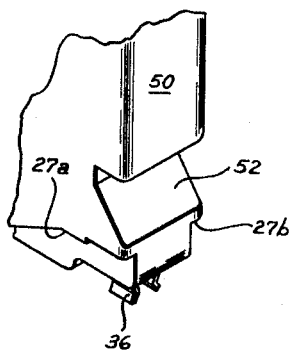
FIG. 16 is a perspective view of a portion of a special type of circuit breaker device showing how the device is modified to permit mounting thereof on the panel assembly while the locking bar is still in place.
Figure 4:
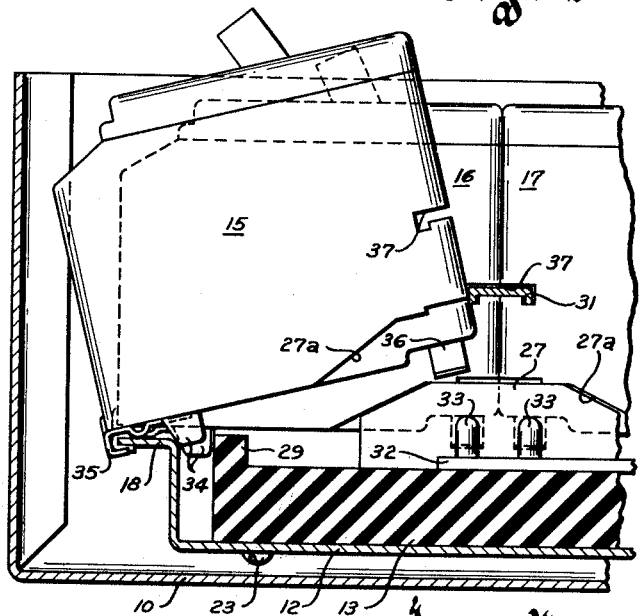
FIG. 4 is a side elevational view, partly in section, of the apparatus shown in FIGS. 1, 2 and 3 which shows the manner in which attachment of an additional circuit breaker to the panel is prevented.

FIG. 16 shows a portion of a circuit breaker device 50 which may be assumed to be identical in all physical respects to circuit breaker device 15, hereinbefore described, except that instead of an L-shaped slot in the front wall of the housing a cutout portion 52 which slopes inwardly is provided. With such a modification, circuit breaker device 50 can be attached or removed from the panel assembly while a locking bar of either of the types hereinbefore described is in place. Such a feature is desirable since some of the regulatory provisions hereinbefore referred to permit, or do not require circuit breaker devices having an electrical rating of 20 amperes or less to be locked against removal from or attachment to the panel assembly.

The several embodiments of the invention are employed as follows.

Consider first the embodiment shown in FIGS. 1, 2 and 3. Assume that the enclosure box 10 with the panel assembly secured therewithin is provided. The screws 20 are then removed to permit the panel assembly to be removed from the box. Circuit breaker devices of suitable rating and modified in accordance with the invention, as described in connection with circuit breaker device 15, are then attached to the panel assembly in appropriate positions. The locking bar 31, having threaded holes 39, is then slid endwise through the L-shaped slots in the circuit breaker casings and positioned so that its holes 39 register with the holes 30 between barriers 26b in insulating board 13 of the panel assembly. The bolts 40 are then inserted from the rear of the panel assembly through the access holes 25 in base plate 12. The threaded ends of the bolts 40 take into the threaded holes 39 in the locking bar 31 and draw the latter firmly against the tops of the end walls of the insulating board. At this point the circuit breakers already on the panel assembly are locked thereto. Note that when the locking bar 31 is in place it overlies vacant position on the panel assembly in such a way as to prevent or interfere with the placement of additional circuit breaker devices with "L-shaped slots" in those vacant positions. The panel assembly is then placed within box 10 and screws 20 are replaced. The necessary electrical wiring connections are then made to the circuit breaker devices and bus bar. It is apparent that the circuit breaker devices attached to the panel assembly cannot be removed and that additional circuit breakers of the same type cannot be added to the panel assembly while the locking bar is in place. However, a circuit breaker device modified as explained in connection with circuit breaker 50 in FIG. 16 could be attached or removed while the bar was in place. Presumably, such circuit breakers would be of low rating, for example 20 amperes, and no hazard would be created by their substitution.

A circuit breaker installation of the foregoing type effectively overcomes the problem of replacement of given circuit breaker devices by those of higher rating since inexperienced or unauthorized personnel are unlikely to have the requisite skill or inclination to disconnect all electrical connections and remove the panel assembly from the enclosure box in order to replace one circuit breaker by another. However, such an installation is readily serviced by a skilled electrician and the apparatus employed is still susceptible of economical mass production and has great flexibility in application.

Consider now the embodiment of the invention which employs the "one-way" bolt 41 shown in FIGS. 5, 6 and 7, to secure the locking bar 31 to the panel assembly. Normally, enclosure box 10 with the panel assembly secured therewithin is secured to the wall (not shown). It will be understood, however, that the nuts 45 have previously been entrapped in wider bore 30a in insulating board 13, as hereinbefore explained. In this type of installation it is unnecessary to remove the panel assembly from the enclosure box 10 and the circuit breaker devices are affixed thereto and the conductor wires (not shown) are attached. Since, with the embodiment shown in FIGS. 5, 6 and 7, it is unnecessary to remove the panel assembly from enclosure box 10 to attach or detach locking bar 31, provision must be made to provide for the insertion or withdrawal of bar 31 through the circuit breaker slots while the circuit breakers and panel assembly are within box 10. This can be accomplished by having an enclosure box of such size with respect to the panel assembly and locking bar that the bar will not interfere with the side walls of the box. Or, if desired, one of the walls of the box may be provided with an access hole such as 60 located as shown in FIG. 5. Locking bar 31 is then inserted through a hole 60 in the side of enclosure box 10, shown in FIG. 5, and slid endwise through the L-shaped slots in the housings of the circuit breaker devices and the barriers 26b until the two untapped holes 39 (only one of which is shown) register with the holes 30 in insulating board 13 of the panel assembly. The "one way" bolts 41 are then inserted from the front of the panel assembly through the holes in the locking bar, through the holes in the insulating board 13 and turned into the nuts 45 by means of an ordinary screw driver (not shown). Once in place, locking bar 31 functions as was hereinbefore explained. Locking bar 31 cannot be removed unless special tool 42 capable of firmly gripping the head of the bolt is employed. Such tools are not readily available to inexperienced or unauthorized personnel.

While in the foregoing description of both embodiments of the invention the locking bars are described as secured at both ends, it is apparent that a single attachment device may be employed with substantially the same result.

The embodiment of the invention which employs the "break off" bolt 43 shown in FIG. 12 is employed in the same manner as that employing the "one way" bolt 41. After bolt 43 is inserted the head 43a is broken off and the bolt 43 cannot be removed unless the tool 42 is employed.

The embodiment of the invention shown in FIGS. 13, 14 and 15 contemplates an ordinary type of bolt 47. After bolt 47 is in place, the cap 46 is placed thereover to conceal the head thereof. This arrangement is intended to discourage tampering with the locking bar 31 by effectively concealing from the unskilled person the manner in which the bar is attached to panel assembly. Skilled authorized personnel, of course, can without difficulty remove the cap 46 to gain access to the head of bolt 47.

It will be apparent that the panel assembly and circuit breaker devices therefor may be employed in the usual manner without the locking bar, if regulations in a particular locale so permit. This fact is of special importance in the economics of mass production manufacture.

I claim:

1. In combination, an enclosure box, a circuit breaker mounting panel assembly mountable within said box and adapted to have a plurality of circuit breaker devices removably mountable thereon, at least one circuit breaker device mounted on said panel assembly, said circuit breaker device having a slot through the casing thereof, a rigid member mounted on said panel assembly and extending through and complemental in cross sectional form to the slot in said circuit breaker device to prevent removal of the latter, said rigid member also preventing attachment of additional circuit breaker devices while mounted on said panel assembly, and means for attaching said rigid member to and detaching it from said panel assembly, said means being arranged to make detachment of said member normally difficult.

2. The combination according to claim 1 wherein said means comprises a threaded member accessible only when said panel assembly is removed from said enclosure box.

3. The combination according to claim 1 wherein said means comprises a so-called "one-way" screw.

4. The combination according to claim 1 wherein said means comprises a screw accessible while said panel assembly is mounted within said enclosure box but having a head which is concealed by a detachable member.

5. The combination according to claim 1 wherein said rigid member is a bar having a channel-shaped cross-sectional form, wherein said slot in the casing of said circuit breaker device is of L-shaped form opening through one end of said casing, and wherein with the bar mounted on said panel assembly the device overlaps not more than one-half the width of the bar to provide for in-line, end-to-end mounting of at least two such circuit breaker devices.

6. In a circuit breaker device for mounting on a panel assembly which is adapted to be secured to said panel assembly by a locking bar, in combination, a housing, means on said housing to connect said circuit breaker device to said panel assembly, and a slot through said housing having a cross sectional form complemental to that of the locking bar which is to extend therethrough and engage with said housing.

7. The combination according to claim 6 wherein said slot through said housing is of L-shaped configuration extending through one end of said housing.

8. In a circuit breaker device for mounting on a panel assembly which has a locking bar secured thereto for holding in place and preventing removal or attachment thereto of circuit breakers having cut away portions extending therethrough which are complemental in form and size to the locking bar, in combination, a housing, means on said housing to connect said circuit breaker device to said panel assembly, said housing having a cut away portion in an end thereof of a size and form in relation to the cross sectional size and form of the locking bar so that it can be attached to or removed from the panel assembly without interference with the locking bar.

References Cited in the file of this patent

UNITED STATES PATENTS

| | | |
|---|---|---|
| 2,530,548 | Stanley | Nov. 21, 1950 |
| 2,790,113 | Brown | Apr. 23, 1957 |
| 2,910,630 | Hammerly | Oct. 27, 1959 |
| 3,037,153 | Koening | May 29, 1962 |